(12) United States Patent
Lang

(10) Patent No.: US 9,078,398 B2
(45) Date of Patent: Jul. 14, 2015

(54) AGRICULTURAL BALER WITH SHAPE SENSORS AND METHOD

(75) Inventor: Eric Ryan Lang, Newhall, IA (US)

(73) Assignee: DEERE & COMPANY, Moline, IL (US)

(*) Notice: Subject to any disclaimer, the term of this patent is extended or adjusted under 35 U.S.C. 154(b) by 454 days.

(21) Appl. No.: 13/481,246

(22) Filed: May 25, 2012

(65) Prior Publication Data

US 2013/0312381 A1    Nov. 28, 2013

(51) Int. Cl.
*A01F 15/04* (2006.01)
*A01F 15/08* (2006.01)

(52) U.S. Cl.
CPC ..... *A01F 15/0825* (2013.01); *A01F 2015/0866* (2013.01)

(58) Field of Classification Search
CPC .................................................. A01F 15/0825
USPC ........... 100/43, 45, 179; 56/10.2 C, 14.7, 341
See application file for complete search history.

(56) References Cited

U.S. PATENT DOCUMENTS

| | | | |
|---|---|---|---|
| 2,887,947 A | | 5/1959 | Claas |
| 4,918,910 A | * | 4/1990 | Sheehan et al. ................. 56/341 |
| 5,226,356 A | | 7/1993 | Schrag et al. |
| 5,408,817 A | * | 4/1995 | Wagstaff ......................... 56/341 |
| 5,615,544 A | * | 4/1997 | Berger et al. ................... 56/341 |
| 5,783,816 A | | 7/1998 | McPherson |
| 6,026,741 A | * | 2/2000 | Lippens et al. ................. 100/41 |
| 6,377,058 B1 | * | 4/2002 | Pemrick ....................... 324/695 |
| 2007/0175341 A1 | | 8/2007 | Roberts |
| 2010/0318253 A1 | * | 12/2010 | Brubaker et al. ............... 701/25 |

FOREIGN PATENT DOCUMENTS

DE    19915312 C1    6/2000

OTHER PUBLICATIONS

European Search Report, dated Sep. 25, 2013 (7 pages).

* cited by examiner

*Primary Examiner* — Jimmy T Nguyen

(57) ABSTRACT

A baler for agricultural material including a reciprocating plunger that compresses crop material in a channel into flakes which are stacked to provide a bale length of the desired size. The baler is towed from and powered by a steerable tractor having an operator display. The channel receiving the plunger has right and left walls which support star wheels having points projecting into the channel for the flakes and bale. The relative movement of the bale from right to left is determined and indicated to the operator of the vehicle to steer right, left or straight to ensure that bales have thickness that is uniform across their width.

16 Claims, 6 Drawing Sheets

AGRICULTURAL BALER WITH SHAPE SENSORS AND METHOD

FIELD OF THE INVENTION

The present invention relates to an agricultural baler, and, more particularly, to a system and method for sensing the shape of bales.

BACKGROUND OF THE INVENTION

A plunger type hay baler includes a frame that is hitched to a tractor and is configured to receive crop material, such as hay or straw, into a pressing cavity in which the crop material is pressed and formed into a bale. The baler includes a loading mechanism in which the crop material is collected from the ground, which is then routed into the pressing channel in a manner that is synchronous with a plunger. The plunger moves in a reciprocating manner in the pressing channel and encounters each new segment (flake) of crop material that is moved into the channel for compacting into a bale. After a sufficient amount of crop material has been compressed in the pressing channel, a twine threading mechanism inserts twine through a portion of the compressed material and the twine is then tied to complete the binding of the bale. The bale then proceeds further through the pressing channel and is ejected from the baling machine.

The shape of the bale in a baling device is important in determining the appropriate length of the bale and rectangularity for the purpose of storing, stacking and transporting. Current systems attempt to determine bale shape and length by sensing pressure forces that are reaction forces exerted against the plunger, and associated mechanism used to compress the flakes. When the force exceeds a given level, the bale is determined to be an appropriate length and then the subsequent processes are initiated.

The problem with this device, however, is that the pressure sensing to determine length of the bale does not occur until the last group of flakes enters the channel in which they are compressed. As a result, flakes can be entered into the chamber that have variable thickness from side to side so that instead of rectangular flakes forming the ultimate bale there may be misalignment between one side and the other. Such a malformation can have an impact on the ability to stack the resulting bales and/or to transport them.

Accordingly, what is needed in the art is a means and method for dynamically and effectively sensing the shape of a bale with an accurate measurement.

SUMMARY

The present invention provides dynamic and effective sensing of the shape of a bale.

The invention, in one form, is directed to a bale shape sensing system including a channel having left and right walls for receiving crop material. A plunger reciprocates in the channel to sequentially compress flakes of crop material into bales. Right and left devices are mounted respectively on the right and left walls of the channel for measuring relative movement of the flakes whereby the shape of a bale is sensed.

The invention, in another form, is directed to an agricultural harvesting device comprising a steerable vehicle for traversing an agricultural field over a row of cut crop material. A baler is movable with the vehicle over the field and the baler has a channel with right and left walls for receiving crop material. A plunger is mounted for reciprocating movement within the channel for compressing crop material into flakes which are stacked to produce a completed bale. Right and left devices are respectively mounted in the right and left walls for determining movement of the right and left ends of the flakes relative to the right and left walls. A control mechanism receives signals from the relative motion devices for generating a signal indicating directional movement to the right, left or straight and a device has an operator display for indicating to the operator which direction to traverse to produce uniformly shaped bales.

The invention, in still another form, is a method of harvesting material with the steps of entering the crop material into a channel bounded by left and right walls. The agricultural crop material is compressed by a reciprocating plunger to produce discrete flakes. Subsequent agricultural crop material is compressed to produce stacked flakes. The movement of the right and left ends of the flakes relative to the right and left side walls is sensed to determine the shape of the bale including a series of stacked flakes.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrate one embodiment of the invention and such exemplification is not to be construed as limiting the scope of the invention in any manner.

DETAILED DESCRIPTION

Figure 1:
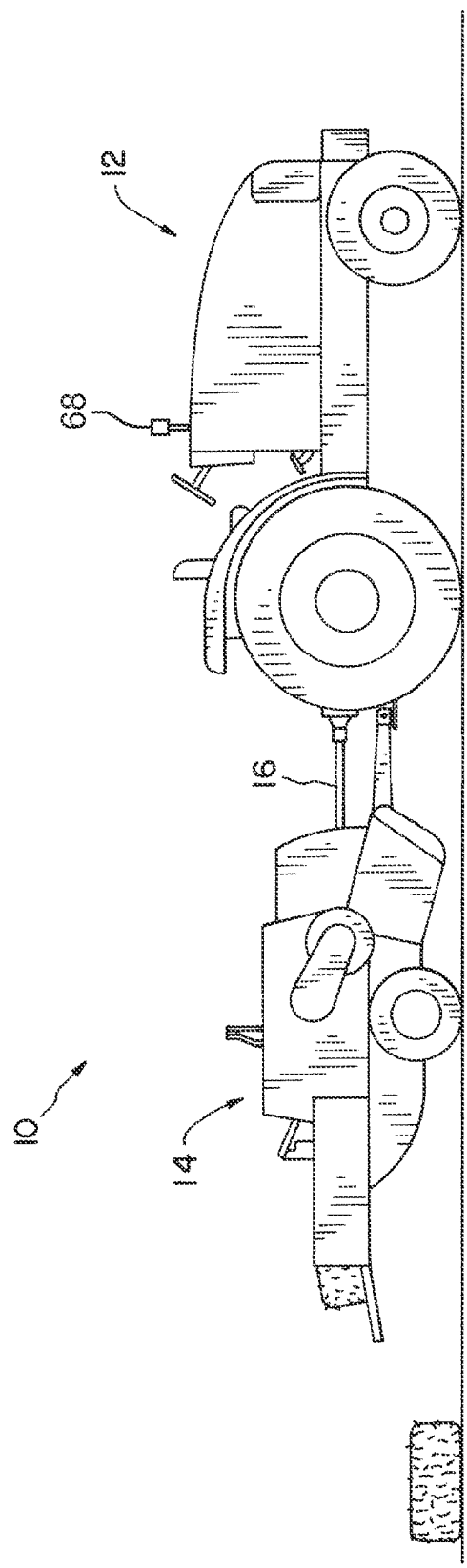
FIG. 1 is a side view of a tractor and baler system utilizing an embodiment of the plunger of the present invention.

Referring now to the drawings, and more particularly to FIG. 1, there is shown an agricultural baling apparatus 10 including a tractor and a baler 14 that is driven by a power take off (PTO) shaft connected therebetween. Although shown as a component towed by and receiving power from a tractor 12 it should be apparent to those skilled in the art that the apparatus may be combined into a single self-propelled and steerable unit and still embody the present invention.

Figure 2:
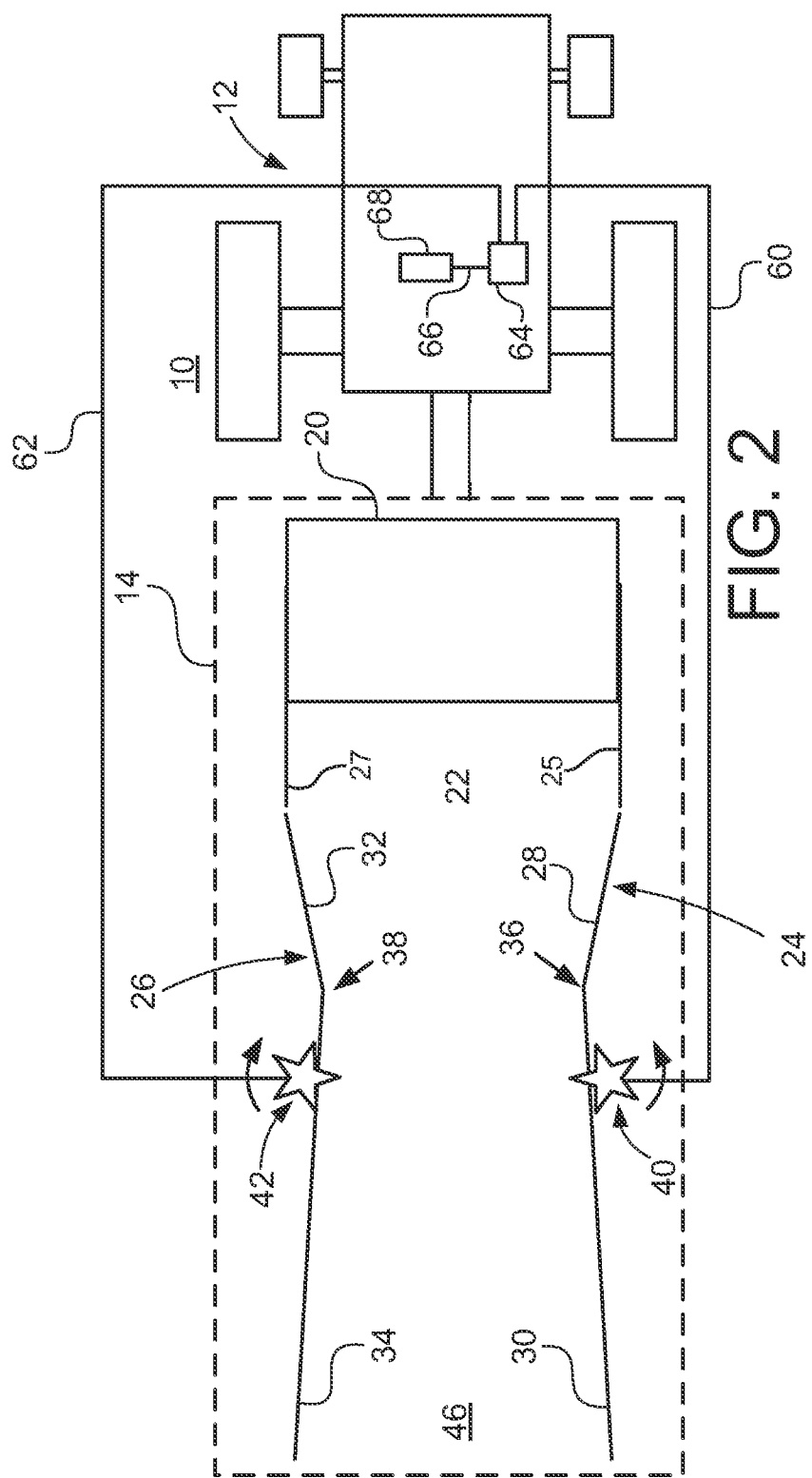
FIG. 2 is a plan view shown in schematic fashion of the baler system of FIG. 1.
Figure 3:
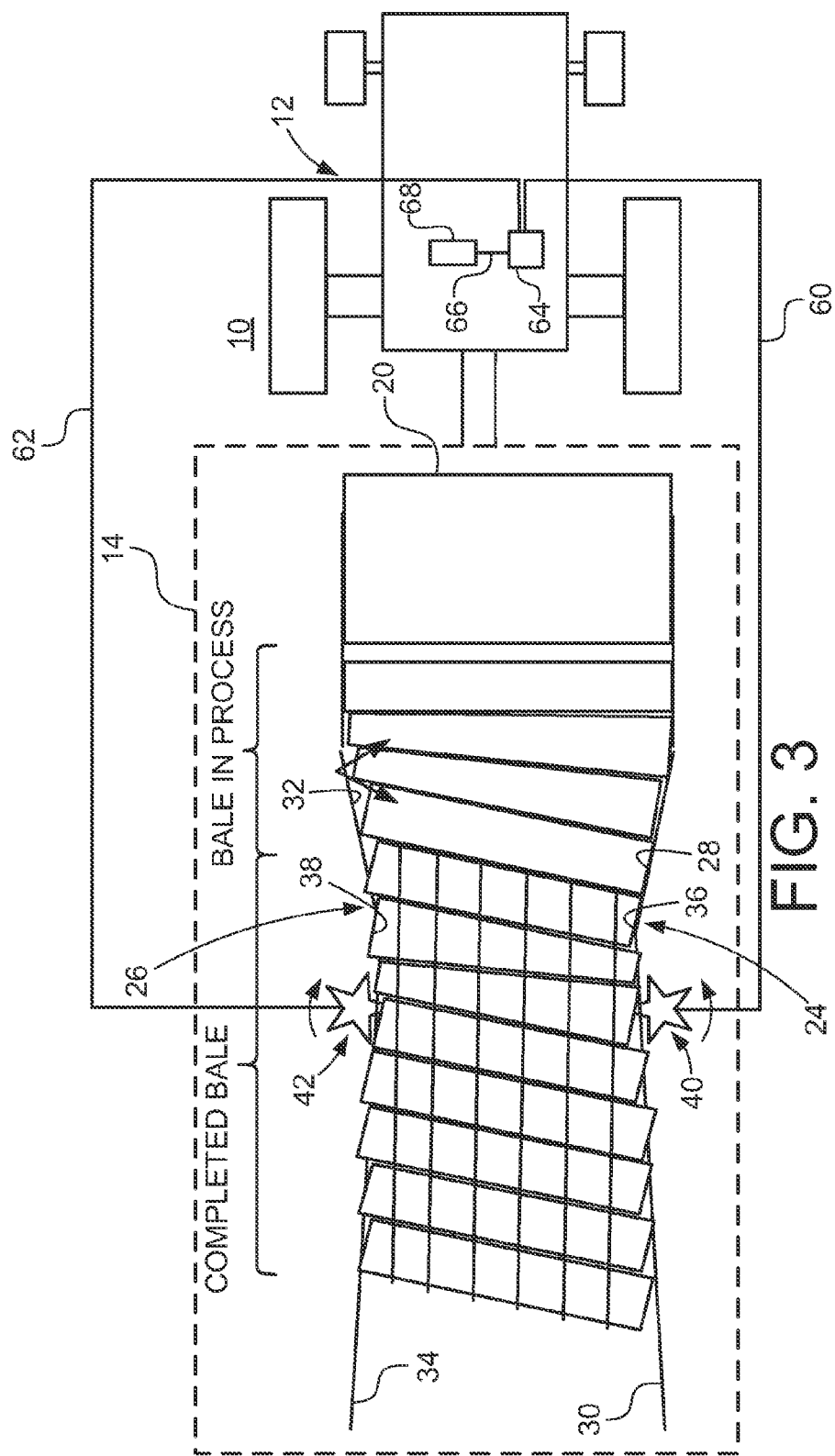
FIG. 3 is a plan view of the baler of FIGS. 1 and 2 showing formation of a bale of agricultural material.

Referring now specifically to FIGS. 2 and 3 a system of FIG. 1 as shown in schematic fashion. The baler 14 shown by dashed lines is of the plunger type and for that purpose a plunger 20 is positioned within a channel 22 to reciprocate and in the process of reciprocation form agricultural product into rectangular segments called flakes 29. Channel 22 is defined by right and left wall assemblies 24 and 26 respectively. Wall section 24 has an upstream portion 25 in which the plunger 20 reciprocates. Section 25 extends to and is integral with a wall section 28 connected to a downstream wall section 30 and angled inward to a vertex 36. Wall assembly 26 has an upstream portion 27 also receiving plunger 20.

Wall section 27 connects with inwardly directed wall section 32 and outwardly directed wall section 34 joined at vertex 38. The upper and lower walls for the channel 22 are not shown to simplify an understanding of the invention. The converging panels are inwardly extending panels 28 and 32 extending to the vertex 36 and 38 provide a narrowing channel in order to apply pressure to the flakes 29 making up bale 31 as later discussed.

The mechanism for reciprocating plunger 20 is not shown to simplify an understanding of the present invention, but in typical form, would be an eccentric crank mechanism receiving rotary power from the PTO 16 converted into reciprocating motion. In addition, the mechanism for feeding the crop material into channel 22 is not shown nor is the mechanism by which the resultant bales 31 are tied is omitted to facilitate an understanding of the process.

Referring now to FIG. 3, there is shown a typical bale that is being processed. The plunger 20 compresses crop material into what is known in the art as individual flakes 29 having a thickness determined by the degree to which the plunger compresses the loose material. The height and the width of the flakes 29 is determined generally by the width and height of the channel 20. As is apparent in FIG. 3 the plunger 20 forms successive flakes 29 which are stacked end to end as they move through the channel 22. The amount of material that comes into the baler 14 is determined by the distribution of the material coming into channel 22 and is, to some extent, determined by the relationship of the tractor and baler relative to rows of agricultural material that have been precut. As stated above, the reciprocating motion of the plunger 20 forces the flakes 29 towards the vertex 36 and 38 of the channel 22. In the stack of flakes 29 towards the left of FIG. 3, the bales have been secured by twine through an appropriate mechanism to result in a bale 31. As is apparent in FIG. 3, some of the flakes 29 may have variable thickness from right to left in the channel 22. Heretofore, the length of the bale has been determined by reaction forces on plunger 20 or on the gear box driven by the PTO 16 so that only a gross measurement of the length of the bale 31 is determined. In the prior art, there is no capability of determining right to left variations in the thickness of the flakes 29.

Figure 4:
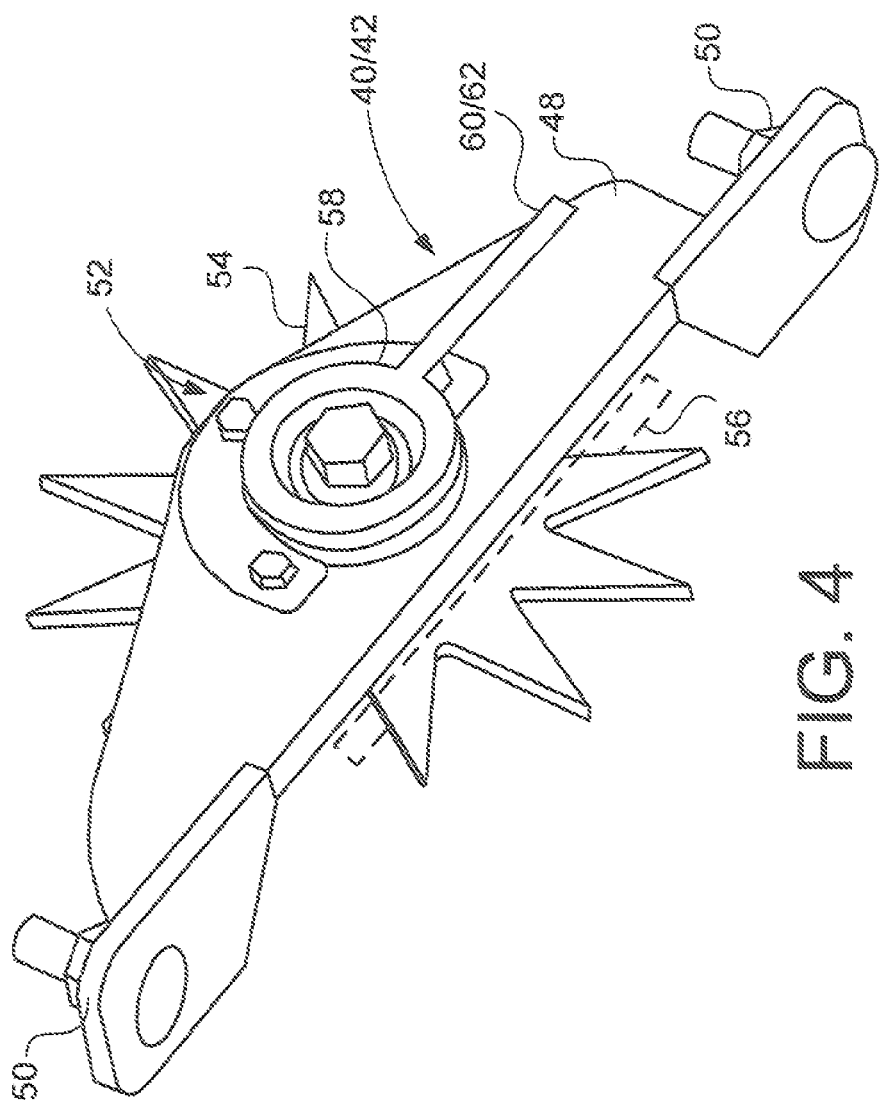
FIG. 4 is a detailed perspective view of a component of a relative movement sensing component of FIGS. 2 and 3.
Figure 5:
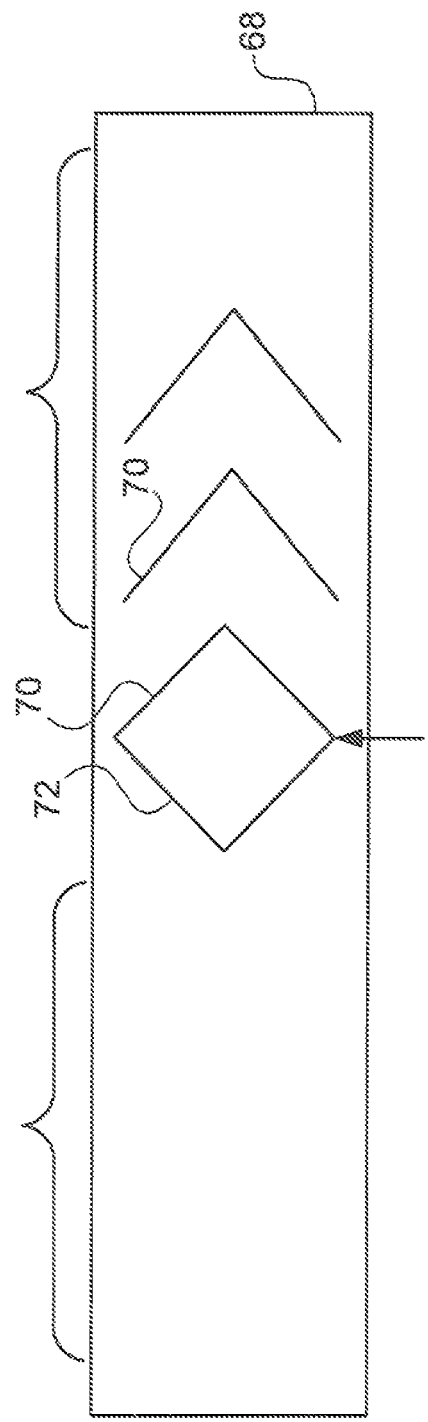
FIG. 5 is a schematic depiction of an operator display incorporated in the baling device of FIGS. 1-4.

In accordance with the present invention right and left devices 40 and 42 are provided to determine movement of the flakes 29 relative to the right and left wall members 24 and 26 so as to indicate which side has a greater thickness than the other. As herein illustrated, the devices 40 and 42 are shown in FIG. 4 as including a star wheel 52 journaled for rotation in a frame 48 which is affixed to the respective side walls by screws 50 and which extends into channel 22 through a slot 56 and the respective side walls. The star wheels 52 have individual points 54 that project into the channel so that the star wheels 52 rotate in response to movement of the flakes 29 relative to the walls of the channel 22. A counter 58 is shown mounted to detect and provide a signal relative to the rotation of the star wheel 52. The signal thus generated is connected via lines 60 or 62 to an ECU 64 which, in turn, is connected to a display 68 via line 66. The number of points 54 and their projection into the channel 22 through slot 56 is selected so as to provide an optimum and accurate measurement of relative movement. In addition, the devices 40 and 42 are positioned downstream of the vertex 36 and 38 where the channel 22 diverges so as to prevent reverse rotation of the devices 40 and 42. This is because any reverse movement of the crop material is minimized, if not eliminated. The display 68 may take a number forms but, as illustrated, is a display having right facing chevrons 70 and left facing chevrons 72. In terms of operator input, the number of chevrons activated to one side or the other, herein illustrated as to the right, indicates to the operator that the tractor 12 must be guided towards the right to maintain a consistent thickness for the bale. When the operator is directed to traverse a straight path, the innermost opposed chevrons 70 and 72 provide a diamond to indicate to the operator the appropriate straight path. While a display of either LED or LCD indicia as chevrons is illustrated, it should be apparent to those skilled in the art that many other forms of a display can be used to guide the operator.

To summarize the method utilized in the operation of the baler 14, the relative movement of the flakes from the left side relative to the right side is determined by the counters 58 and through internal electronics converted into a signal directing the operator to either turn to the left or turn to the right or traverse a straight path. The number of activated chevron elements indicate to the operator the degree to which the tractor must be turned to traverse the center of the row of agricultural material.

Figure 6:
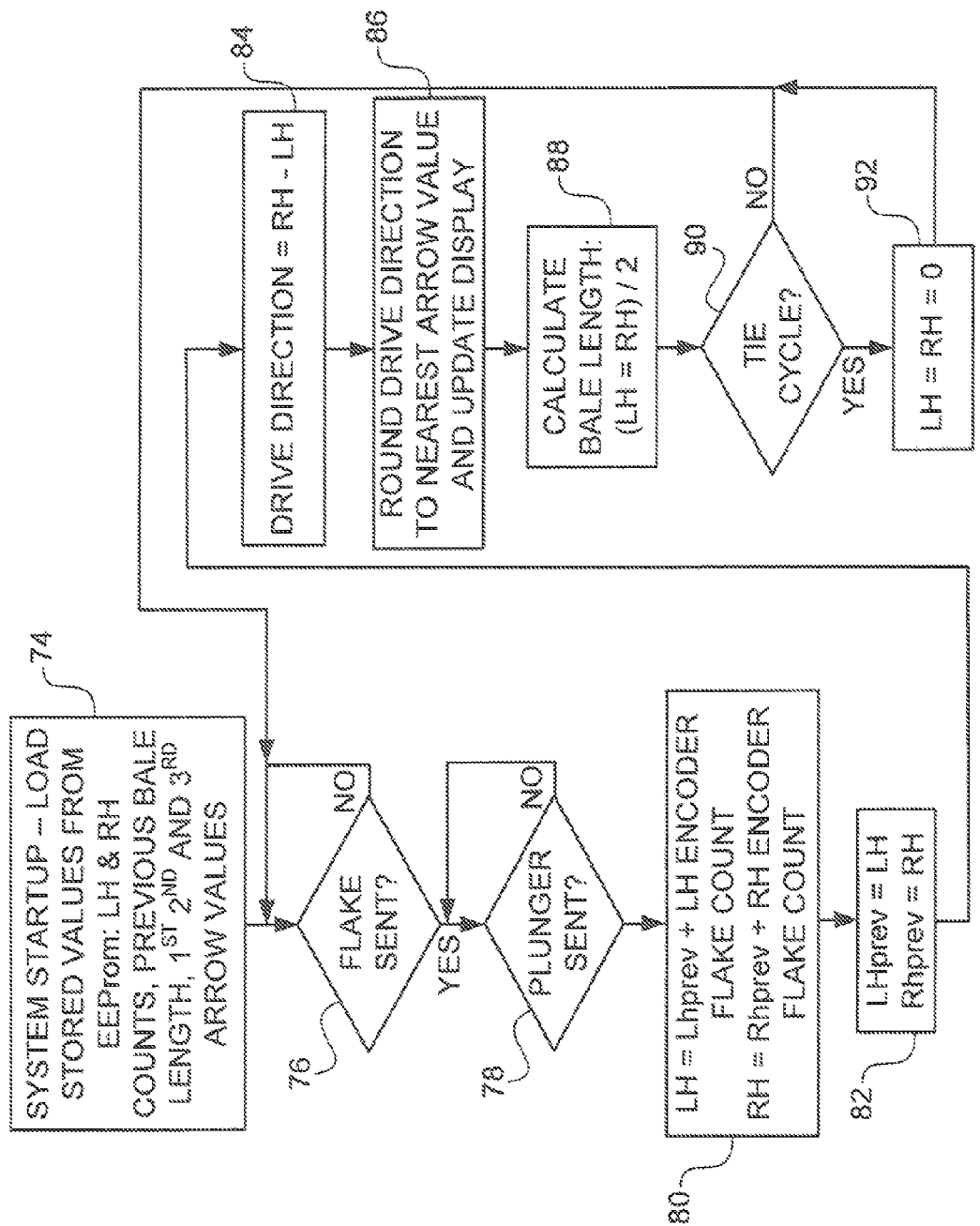
FIG. 6 is a chart indicating the sequence of steps shown in the method of FIGS. 1-5.

The detailed implementation of the method is illustrated in FIG. 6 in which the elements of the control system are shown in block fashion. In step 74 there is a system startup and stored values from the EEprom for left hand and right hand counts, previous bale length, first, second and third stored values of the correction indicators (chevrons) are loaded. In step 76, it is determined whether a flake has been sent and if it has in this indicates that a flake has been entered into the channel. In step 78 it is indicated where whether the plunger 20 has been sent which begins the compression process of the flakes. In step 80, both the left hand and right hand flake counts are determined and the difference between the counts is determined in step 82 so that in step 84 the drive direction either right, left or straight is indicated on display 68. In step 86, the drive direction is rounded to the nearest arrow value and the display 68 is updated. In step 88, the bale length is calculated by determining the number of counts for the left hand adding to the counts of the right hand divided by two. When the appropriate bale length is reached, the tie cycle is initiated in step 90 which causes the twine 44 to be automatically secured around the completed bales 31. At that point, the left hand and right hand counts are summed to zero and the cycle repeated.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A bale shape sensing system for bales comprising:
   a channel having right and left walls for receiving crop material;
   a plunger reciprocating in said channel to compress flakes of material into bales; and,
   right and left devices mounted respectively on said right and left walls for measuring relative movement of said flakes;
   whereby the malformation of a bale is sensed.

2. The bale shape sensing system as claimed in claim 1, wherein said devices are mounted in said right and left walls and project into said channel.

3. The bale shape sensing device as claimed in claim 2, wherein said relative movement devices are star wheels having points projecting into said channel.

4. The bale shape sensing system as claimed in claim 3, further comprising a device for counting rotation of said star wheels whereby relative movement may be sensed.

5. The bale shape sensing system as claimed in claim 2, wherein said devices are mounted in said right and left walls and positioned relative to said channel so that reverse direction movement or spring back of the crop material is minimized.

6. The bale shape sensing system as claimed in claim 5, wherein said channel walls converge and diverge from a vertex and said relative motion sensing devices are downstream of said vertex.

7. An agricultural harvesting device comprising:
 a steerable vehicle for traversing an agricultural field over a row of cut crop material;
 a baler movable with the vehicle over the field, said baler having a channel with right and left side walls for receiving crop material;
 a plunger mounted for reciprocating movement within said channel for compressing crop material into flakes which are stacked to produce a completed bale; and
 right and left devices respectively mounted in said right and left walls for determining movement of the right and left flakes relative to the right and left walls;
 a control device for receiving signals from said relative motion devices for generating a signal indicating directional movement to the right, left or straight, said electronic device feeding a signal to an operator display for indicating to the operator which direction to traverse to produce uniformly shaped bales.

8. The agricultural harvesting device as claimed in claim 7, wherein said devices are mounted in said right and left walls and project into said channel.

9. The bale shape sensing device as claimed in claim 8, wherein said relative movement devices are star wheels having points projecting into said channel.

10. The agricultural harvesting device as claimed in claim 9, further comprising a device for counting rotation of said star wheels whereby relative movement may be sensed.

11. The agricultural harvesting device as claimed in claim 7, wherein said devices are mounted in said right and left walls and positioned relative to said channel so that reverse direction movement or spring back of the crop material is minimized.

12. The agricultural harvesting device as claimed in claim 11, wherein said channel walls converge and diverge from a vertex and said relative motion sensing devices are downstream of said vertex.

13. The agricultural harvesting device as claimed in claim 7, wherein said control device compares the relative movement of the right and left sides of said flakes and averages the movement to produce a predetermined bale length.

14. The agricultural harvesting device as claimed in claim 13, further comprising an operator display receiving signals from said control device to direct an operator to turn one of right, left or straight.

15. The agricultural harvesting device as claimed in claim 14, wherein said operator display includes right facing and left facing chevrons, the number of chevrons activated indicating to the operator the degree to which the operator should turn to produce uniformly shaped bales.

16. The agricultural harvesting device as claimed in claim 15, wherein said innermost right and left facing chevrons of said operator display are activated to show a diamond pattern.

\* \* \* \* \*